United States Patent [19]
Ueda et al.

[11] 4,168,892
[45] Sep. 25, 1979

[54] LENS EXCHANGEABLE CAMERAS WITH LOCKING DEVICE

[75] Inventors: Hiroshi Ueda, Nara; Kunio Kawamura, Sakai, both of Japan

[73] Assignee: Minolta Camera Kabushiki Kaisha, Osaka, Japan

[21] Appl. No.: 857,033

[22] Filed: Dec. 2, 1977

[30] Foreign Application Priority Data

Dec. 6, 1976 [JP] Japan .............................. 51-145672
Dec. 13, 1976 [JP] Japan .............................. 51-148696

[51] Int. Cl.² .......................... G03B 7/20; G03B 17/20
[52] U.S. Cl. ...................................... 354/38; 354/46; 354/60 E; 354/271; 354/286
[58] Field of Search ................... 354/37, 38, 53, 60 R, 354/60 E, 60 L, 286, 289, 271, 272, 41, 43, 46, 47

[56] References Cited

U.S. PATENT DOCUMENTS

| | | | |
|---|---|---|---|
| 3,829,867 | 8/1974 | Ono | 354/28 |
| 3,864,707 | 2/1975 | Shirasaki | 354/271 |

FOREIGN PATENT DOCUMENTS

2705187  9/1977  Fed. Rep. of Germany ........... 354/289

Primary Examiner—Michael L. Gellner
Attorney, Agent, or Firm—Watson, Cole, Grindle & Watson

[57] ABSTRACT

A lens-exchangeable, single lens reflex camera of the TTL light measurement type, which is selectively settable to a shutter speed priority diaphragm automatic control mode, a diaphragm priority shutter speed automatic control mode, and a manual exposure control mode, includes a locking device arranged on a camera body for locking a diaphragm presetting member of an exchangeable lens at a specific position wherein indication of a f-number representative of an automatically controlled diaphragm aperture is allowed with a diaphragm of the exchangeable lens being held at its fully open aperture. An exposure mode change-over mechanism may be interlocked with the locking device such that the camera is set to the shutter speed priority diaphragm automatic control mode when the locking device is brought into its operative condition to lock the diaphragm presetting member at the specific position. The locking device can be brought into its inoperative condition to release the diaphragm presetting member by manipulation thereof, or in association with releasing of the exchangeable lens from its locked condition for removing the same from the camera body.

10 Claims, 10 Drawing Figures

LENS EXCHANGEABLE CAMERAS WITH LOCKING DEVICE

BACKGROUND OF THE INVENTION

This invention relates to lens-exchangeable cameras of the TTL (through the lens) light measurement type, capable of selecting dual exposure control modes, and more particularly relates to a locking device for such cameras, which device can lock a diaphragm presetting member of an exchangeable lens at a specific position wherein indication of a f-number representative of an automatically controlled diaphragm aperture is allowed with the diaphragm being held at its fully open aperture.

The term "dual exposure control mode" as used herein relates to modes of photography of a camera, in which a shutter speed priority diaphragm automatic control mode and at least either a diaphragm priority shutter speed automatic control mode or a so-called manual exposure control mode, in which both a shutter speed and a diaphragm aperture are manually set for exposure, may be changed over from one to the other.

In order for cameras of the above described type to enable indication of a f-number representative of an automatically controlled diaphragm aperture with the diaphragm of an exchangeable lens being held at its fully open aperture, information of the fully open aperture inherent to each exchangeable lens is necessary. To this end, in the case of the shutter speed priority diaphragm automatic control mode, a diaphragm presetting member of an exchangeable lens mounted on a camera body is set to a specific position wherein information of the fully open aperture of the exchangeable lens can be directly or indirectly introduced into an indicating device within the camera body.

Moreover, photography is often repeatedly taken in the shutter speed priority diaphragm automatic control mode in cameras of the above described type. In this case, it is necessary that the diaphragm presetting member remains in the specific position as described. However, it is mandatory that the diaphragm presetting member is prevented from being moved from the specific position even with inadvertent contact of a photographer's hand or the like. Otherwise, the photography intended by the photographer can not be continuously taken since the camera can no longer indicate that f-number representative of an automatically controlled diaphragm aperture.

SUMMARY OF THE INVENTION

It is, accordingly, an object of the present invention to provide a camera of the above described type, which is provided with a locking device for preventing accidential movement of a diaphragm presetting member of an exchangeable lens when the diaphragm presetting member is once set to a specific position wherein indication of the f-number representative of an automatically controlled diaphragm aperture is provided with the diaphragm of the exchangeable lens being held at its fully open aperture.

DESCRIPTION OF THE PREFERRED EMBODIMENTS

In the structure and operation of a dual exposure control mode of a camera of the single lens reflex type: first and second information transmitting members are provided on a diaphragm presetting member for an exchangeable lens; first and second information receiving members, which are engageable with the first and second information transmitting members, are provided in a camera body, thereby providing first and second transmission systems, in which the first and second information transmitting members engage the first and second information receiving members; the first transmission system is established when an exchangeable lens is mounted on a camera body; when the first transmission system alone is established, an exposure control circuit in the camera is set to a diaphragm priority shutter speed automatic control mode; and an exposure indicating device indicates a shutter speed to be automatically controlled by the aforesaid circuit.

Camera employing the first and second information transmission systems have been proposed in co-pending applications Ser. Nos. 804,290 and 834,971 assigned to the same assignee and entitled "INDICATING DEVICE FOR SINGLE LENS REFLEX CAMERA". In the cameras, the second transmission system may be established by bringing a diaphragm presetting member for an exchangeable lens to a specific position, whereby information of a minimum aperture value (i.e., a maximum f-number) of a diaphragm for the exchangeable lens is transmitted to the camera body. This information is combined with other information of the step-difference from the minimum to maximum f-numbers of the exchangeable lens, which is transmitted by the first information transmission system, so that information of the minimum f-number, representative of a fully open aperture of the exchangeable lens, is derived from the above two sets of information. Thus, indication of the f-number representative of an automatically controlled aperture is provided with the diaphragm being held at its fully open aperture.

Figure 1:
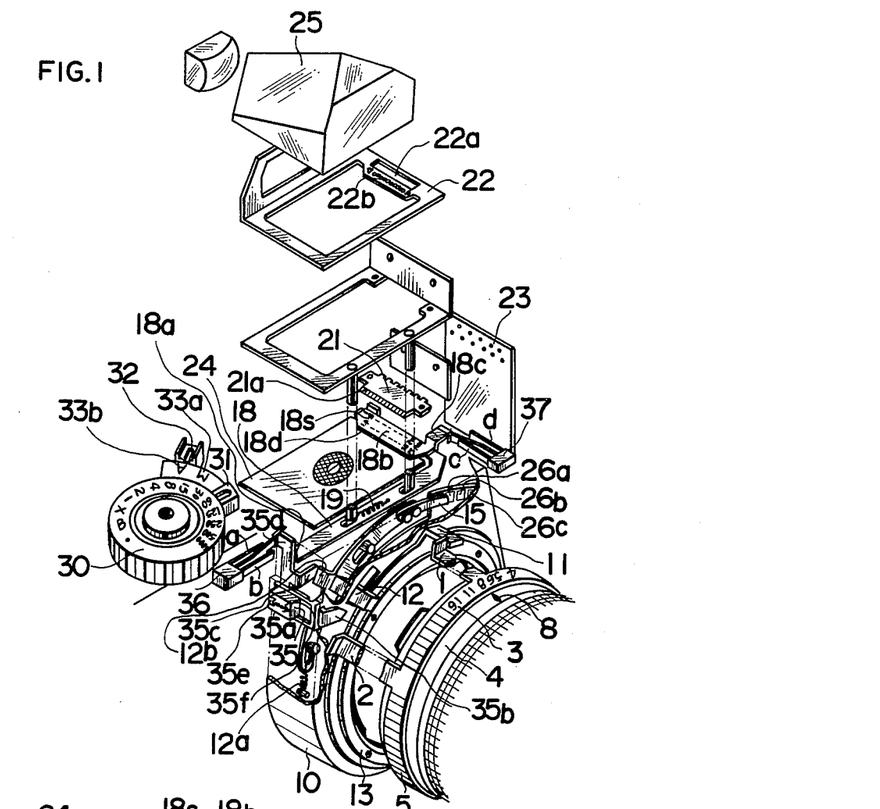
FIG. 1 is an exploded perspective view showing a single lens reflex camera according to a first embodiment of the present invention in the condition of the diaphragm priority shutter speed automatic control mode.
Figure 2:
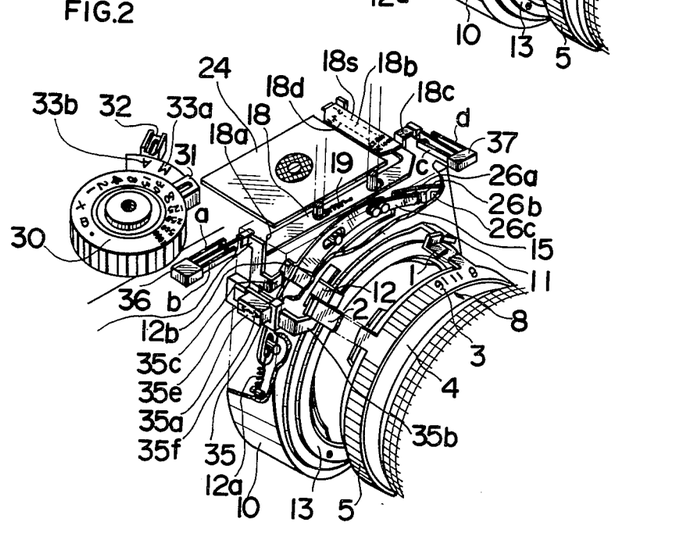
FIG. 2 is a fragmentary perspective view showing the camera of FIG. 1 in the condition of the shutter speed priority diaphragm automatic control mode.
Figure 3:
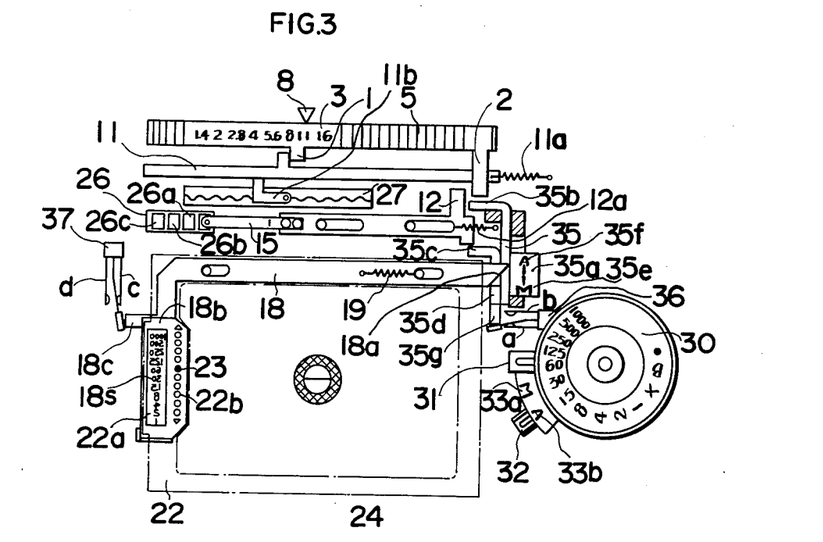
FIGS. 3 and 4 are schematic plan views showing an essential structure of the camera of FIG. 1 in the condition of the diaphragm priority shutter speed automatic control mode and the shutter speed priority diaphragm automatic control mode, respectively.
Figure 4:
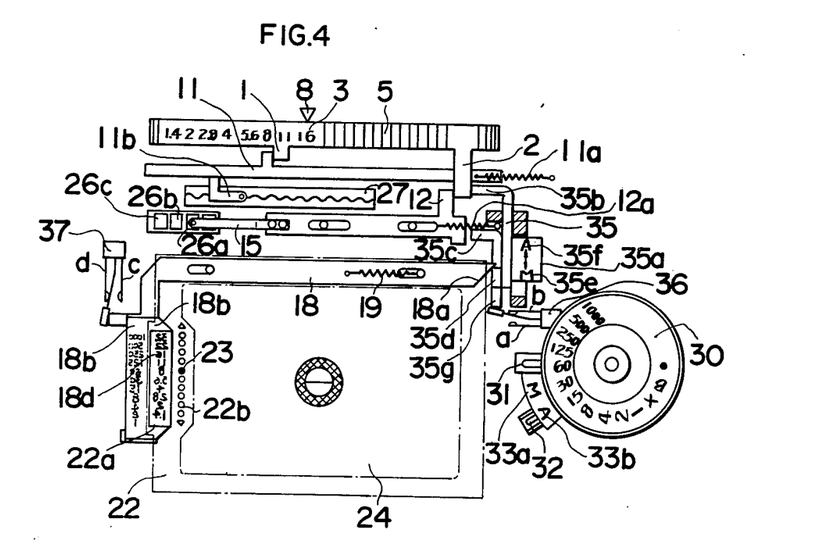

With respect to FIGS. 1 and 2 first information receiving member 11 is positioned on the side of camera body 10 around a bayonet seat plate 13 adapted to mount an exchangeable lens 4 on the camera body. First information receiving member 11 may be rotated along seat plate 13, and loaded by means of a spring 11a shown in FIGS. 3 and 4 to rotate counterclockwise. When exchangeable lens 4 is mounted on camera body 10, member 11 may engage first information transmitting member 1 which is adapted to project from a diaphragm presetting member 5 that is manually rotatable around the lens barrel for exchangeable lens 4. Member 11 is rotated against the action of spring 11a commensurate with the difference between the minimum f-number for the exchangeable lens and a f-number preset by diaphragm presetting member 5. The above difference in the f-number is transmitted via the first transmission system to camera body 10 as information from the exchangeable lens. A brush 11b shown in FIGS. 3 and 4 is secured to member 11. Brush 11b slidingly moves on a potentiometer 27 positioned within the camera body, thereby setting potentiometer 27 a resistance commensurate with the aforesaid difference in f-number.

A second information receiving member 12 projects from camera body 10 around bayonet seat plate 13, and is loaded by a spring 12a to rotate counterclockwise as in the case of first information receiving member 11. The left-hand side edge of member 12 is engageable with projection 35c on a locking member 35 to be described later, while the front portion of member 12 is engageable with member 2 projecting from diaphragm presetting member 5 for exchangeable lens 4. Thus, when the both members are brought into engagement, the second transmission system may be established. This engagement is established only when the maximum f-number 3 (F-16) (in the case of the exchangeable lens shown) is set to an index 8 as shown in FIG. 2, while the engagement is not established when the other f-number is set to index 8 as shown in FIG. 1, and the member 12 is drawn by spring 12a so as to be positioned at the counterclockwise extremity of its rotation.

When the second transmission system is brought into engagement, information of the maximum f-number (F-16), to which exchangeable lens 4 can be stopped down, is transmitted to camera body 10. For this reason, a distance or angle from the maximum f-number 3 to the second information transmitting member 2 on diaghragm presetting member 5 is provided commensurate with the maximum f-number of an exchangeable lens. Stated differently, when member 12 on the camera body is at its counterclockwise extremity of rotation, where member 12 is drawn by spring 12a, as shown in FIG. 1, the second transmission system is not established, so that information of the maximum f-number is not transmitted to camera body 10. In contrast thereto, as shown in FIG. 2, when member 2 engages member 12 to rotate the same clockwise by one step against the action of spring 12a, then sliding brush 15 secured to member 12 slidingly moves on a fixed resistor 26 rightwards by one step so as to contact a contact 26a, whereby information of the maximum f-number of exchangeable lens 4 (F-16) is transmitted to camera body 10.

Moreover, when an exchangeable lens 4 having a maximum f-number (F-22) is mounted on camera body 10, sliding brush 15 is moved on fixed resistor 26 by two steps so as to contact a fixed contact 26b, whereby the maximum f-number of exchangeable lens 4 (F-22) is transmitted to camera body 10. Furthermore, when an exchangeable lens 4 having a maximum f-number (F-32) is mounted on camera body 10, sliding brush 15 is moved on fixed resistor 26 by three steps so as to contact a fixed contact 26c, whereby information of the maximum f-number of the exchangeable lens (F-32) is transmitted to camera body 10.

At this time, first information transmitting member 1 transmits to camera body 10 information of the difference in f-number from the minimum f-number to the maximum f-number.

Shown at 30 is a shutter speed dial, on which are marked shutter speed graduations to be set by priority. By registering one of the shutter speed graduations with index 31, the shutter speed represented by the registered graduation may be set. An exposure mode selecting member 32 is rotatable around the periphery of shutter dial 30. Exposure mode selecting member 32 may select either a manual exposure control mode graduation 33a or an automatic exposure control mode graduation 33b. When manual exposure control mode graduation 33a is selected, then a so-called manual mode may be set, in which an exposure is controlled with a diaphragm aperture and a shutter speed, which are set manually. When automatic exposure control mode graduation 33b is selected, the diaphragm priority shutter speed automatic control mode or diaphragm automatic control mode photography may be effected.

The following is a description of the change-over of the exposure control modes and indication associated therewith and locking of diaphragm presetting member 5 by a locking member in a specific exposure mode.

As shown in FIGS. 1 and 2, a change-over plate 18 is positioned above member 12 in a manner slidable rightwards and leftwards relative to camera body 10, being guided by a pin. As shown in FIGS. 3, 4, change-over plate 18 is so loaded by means of a spring 19 as to move rightwards (leftwards in FIGS. 1 and 2). The righthand end of plate 18 is formed with a tapered surface 18a, while the lefthand end thereof is formed with a graduation plate 18b and a switch actuating projection 18c. A locking member 35 which is slidingly movable in the longitudinal direction is provided on a camera body in opposed relation to tapered surface 18a. Locking member 35 has an operating portion 35a adapted to manually slidingly move locking member 35. Provided on top surface of locking member 35 are a diaphragm automatic control graduation "A" 35f, and a diaphragm manual setting graduation "M" 35e. In addition, locking member 35 is formed with a projection engageable with member 2; a projection 35c engageable with member 12; an operating projection 35d adapted to drive graduation plate 18 so as to slidingly move the same, in engagement with tapered surface 18a; and an operating projection 35g for use with change-over switch 36, which projection may engage a movable contact of change-over switch 36. Provided in parallel on the graduation plate 18b are two rows of shutter speed graduations 18a and f-number graduations 18d which extend in parallel with the optical axis of exchangeable lens 4. Either graduations 18s or 18d are inserted between a transparent light guide 21 within a viewfinder and a graduation-transmissive slot 22a formed on a limiting mask 22, depending on the sliding movement of change-over plate 18. A plurality of light emitting diodes 23 are adapted to emit light under control by the control circuit to be described. Light from one of the light emitting diodes, which is being lit, is reflected upwards on a reflecting surface 21a of the light guide and then into a corresponding small hole 22b parallel with the slot 22a in limiting mask 22.

Figure 5:
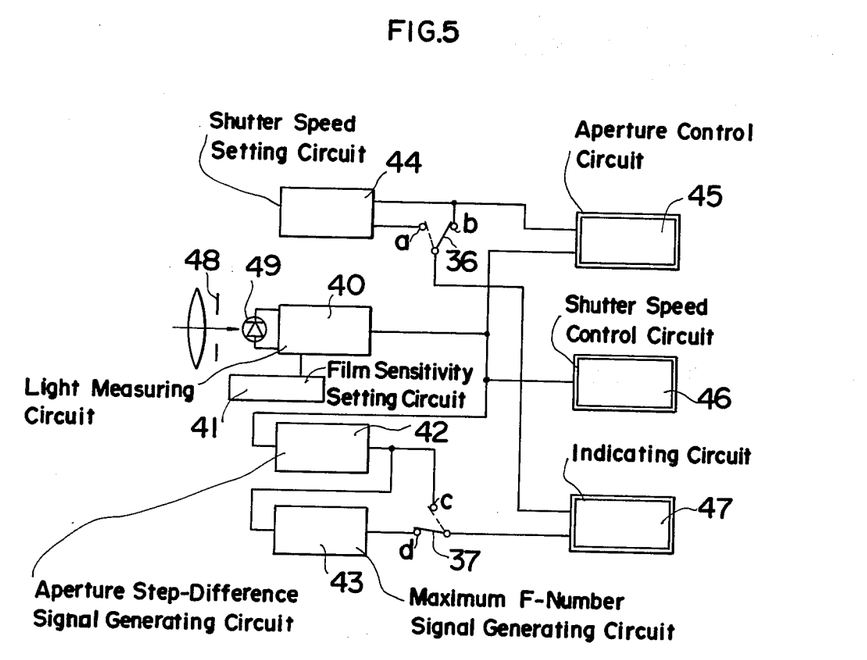
FIG. 5 is a schematic block diagram of a control circuit employed in the camera of FIG. 1.

With respect to the control circuit shown in FIG. 5 information of the film sensitivity to be set by a film sensitivity-setting circuit 41 is fed into a light measuring circuit 40. Light measuring circuit 40 includes a light receiving element 49, on which is incident object light having passed through a diaphragm aperture 48 which is controlled or set actually. In the case where changeover switch 36 is connected to a contact c, an output of the light measuring circuit is fed into an indicating circuit 47 via f-number-step-difference-signal-generating circuit 42 and contact C of switch 37. The output is compared with a predetermined reference signal which is transmitted from a shutter speed signal generating circuit 44 via contact a of switch 36 to indicating circuit 47, so that an optimum shutter speed is indicated by lighting one of light emitting diodes 23. An output of light measuring circuit 40 is fed into exposure time control circuit 46, together with the set f-number information from f-number-step-difference-signal-generating circuit 42, thereby controlling the shutter speed.

When switch 36 is connected to contact b, and switch 37 is connected to a contact d, then an output of light measuring circuit 40 is fed via f-number-step-difference-signal-generating circuit 42 and maximum f-number signal generating circuit 43 as well as via contact d of switch 37 into indicating circuit 47, for comparison with a set shutter speed signal from shutter speed signal generating circuit 44, so that an optimum f-number may be indicated by means of one of light emitting diodes 23. At the same time, a light measuring output of light measuring circuit 40, together with the set shutter speed signal from shutter speed signal generating circuit 44, is fed to an automatic diaphragm aperture circuit 45, thereby automatically controlling the diaphragm of exchangeable lens 4. An error in the determination of a f-number at this time is fed back to exposure time control circuit 46 as a result of measurement of light having passed through diaphragm 48, so that compensation of the set shutter speed may be automatically effected.

With the aforesaid arrangement, when a graduation other than the maximum f-number graduation on diaphragm presetting member 5 is set to index 8, the second transmission system is not established and member 12 is drawn by spring 12a so as to assume the left-hand extremity of its rotation, as shown in FIG. 1. At this time, projection 35b of locking member 35 as shown in FIG. 3 engages member 2, so that the foreward movement of member 2 is prevented, and diaphragm manual graduation 35e is indicated, thereby indicating that the camera is brought into a diaphragm priority shutter speed automatic control mode. In addition, projection 35c of an operating piece brings locking member 35 to the right-hand extremity of its rotation (left-hand extremity in FIG. 1), without engaging member 12. However, projection 35d does not urge change-over plate 18 to the left in FIG. 3, and change-over plate 18 is moved to the right under the action of spring 19, so that left-row shutter speed graduations 18s on change-over indicating plate 18b are indicated in slot 22a in limiting mask 22, while change-over-switch-operating projection 18c causes switch 37 to contact contact C. In addition, a switch operating projection 35g on locking member 35 causes change-over switch 36 to be connected to contact a, thereby bringing the control circuit into a diaphragm priority shutter speed automatic control mode.

In contrast thereto, when maximum f-number graduation 3 on diaphragm presetting member 5 is set to index 8 as shown in FIG. 2, then the second transmission system is established, so that member 12 is pushed by means of member 2 from the left-hand extremity (right-hand extremity in FIG. 4), to which member 12 is biased under the action of spring 12a, and information of the maximum f-number of exchangeable lens 4 is transmitted to camera body 10. At the same time, locking member 35 whose advance is prevented by means of projection 35b engaging member 2 becomes capable of advancing by a manual operation. The advance of locking member 35 by a manual operation causes projection 35c to prevent member 12 from returning to the right-hand extremity of the movement due to an unexpected movement of diaphragm presetting member 5. At this time, member 12 has been pushed to the left by means of member 2 from the right-hand extremity (left-hand extremity in FIG. 2) against the action of spring 12a. In addition, change-over plate operating projection 35d pushes tapered portion 18a of change-over plate 18, thereby moving plate 18 to the left against the action of spring 19. As a result, diaphragm aperture graduations 18d on graduation plate 18b are inserted between slot 22a in limiting mask and light guide 21, thereby providing indication of f-number graduations 18d in the viewfinder, and change-over switch 36 and change-over switch 37 are connected to contact b and d, respectively, thereby bringing the control circuit into the shutter speed priority diaphragm automatic control mode.

As has been described thus far, according to the present embodiment, the shutter speed priority diaphragm automatic control mode is selected and indication of a f-number representative of an automatically controlled aperture is made possible, when diaphragm presetting member 5 is set to the maximum f-number so as to establish the second transmission system, mode selecting member 32 is set to select graduation 33b and locking member 35 is set to the diaphragm automatic control position. In addition, diaphragm presetting member 5 is locked in the above maximum f-number position so as to be prevented from inadvertent movement, so that photographs may be repeatedly taken in the shutter speed priority diaphragm automatic control mode. In addition, in case diaphragm presetting member 5 is not set to the maximum f-number position, it can not be locked by means of locking member 35, so that this fact may be confirmed with ease.

FIGS. 6 to 9 show a second embodiment of the invention.

Shown at 132 is an exposure mode selecting member adapted to rotate around a shutter speed dial 30. When exposure mode selecting member 132 is set to an index 133a, then a manual exposure control mode is selected; when set to an index 133b the diaphragm priority shutter speed automatic control mode is selected; and when set to an index 133c, the shutter speed priority diaphragm automatic control mode is selected.

In this embodiment, a slide plate 134 engages through the medium of a pin 134a with mode selecting member 132, and slide plate 134 is formed with a stop pin 134b, with which intermediate lever 135 coacts. Intermediate lever 135 continuously engages an end portion 18f of change-over plate 18, which is loaded to move to the right under the action of a spring 19.

Slide plate 134 is formed with a switch actuating projection 134c, thereby operating change-over switches 36, 37 opposed to projection 134c.

The control circuit is the same as that of FIG. 5.

When exposure mode selecting member 132 is set to index 133b, change-over switch 36 is connected to a contact a, switch 37 is connected to a contact c, and the circuit is brought into the diaphragm priority shutter speed automatic control mode. Thus, an output of light measuring circuit 40 is fed into indicating circuit 47, together with the signal fed from f-number-step-difference-signal-generating circuit 42, and also directly fed into exposure time control circuit 46, thereby automatically controlling the shutter speed as well as indicating the shutter speed controlled.

When exposure mode selecting member 132 is set to index 133c, change-over switch 36 is connected to a contact b, changeover switch 37 is connected to contact d, and the circuit is brought into the shutter speed priority diaphragm automatic control mode. The output of light measuring circuit 40 is fed to maximum f-number signal generating circuit 43. Additionally, when diaphragm presetting member 5 is set to the maximum f-number of exchangeable lens 4, the light measuring output, information of the number of steps to be stopped down from the minimum f-number to the maximum f-number, and information of the maximum f-number are fed into indicating circuit 47 via contact d of switch 37. The set shutter speed signal is also fed from shutter speed signal generating circuit 44 via contact b of switch 36 to indicating circuit 47, and then indicating circuit 47 compares the both inputs, thereby lighting one of light emitting diodes 23 depending on the results of the comparison, and indicating an optimum f-number on graduations 18d. Further an output of light measuring circuit 40 is fed to diaphragm automatic control circuit 45, along with a set signal from shutter speed signal generating circuit 44, thereby automatically controlling the diaphragm. An error incurred in determining the diaphragm aperture at this time is fed back to exposure time control circuit 46 as a result of measurement of object light having passed through diaphragm 48, whereby automatic compensation of the set shutter speed is effected.

Figures 6, 7:
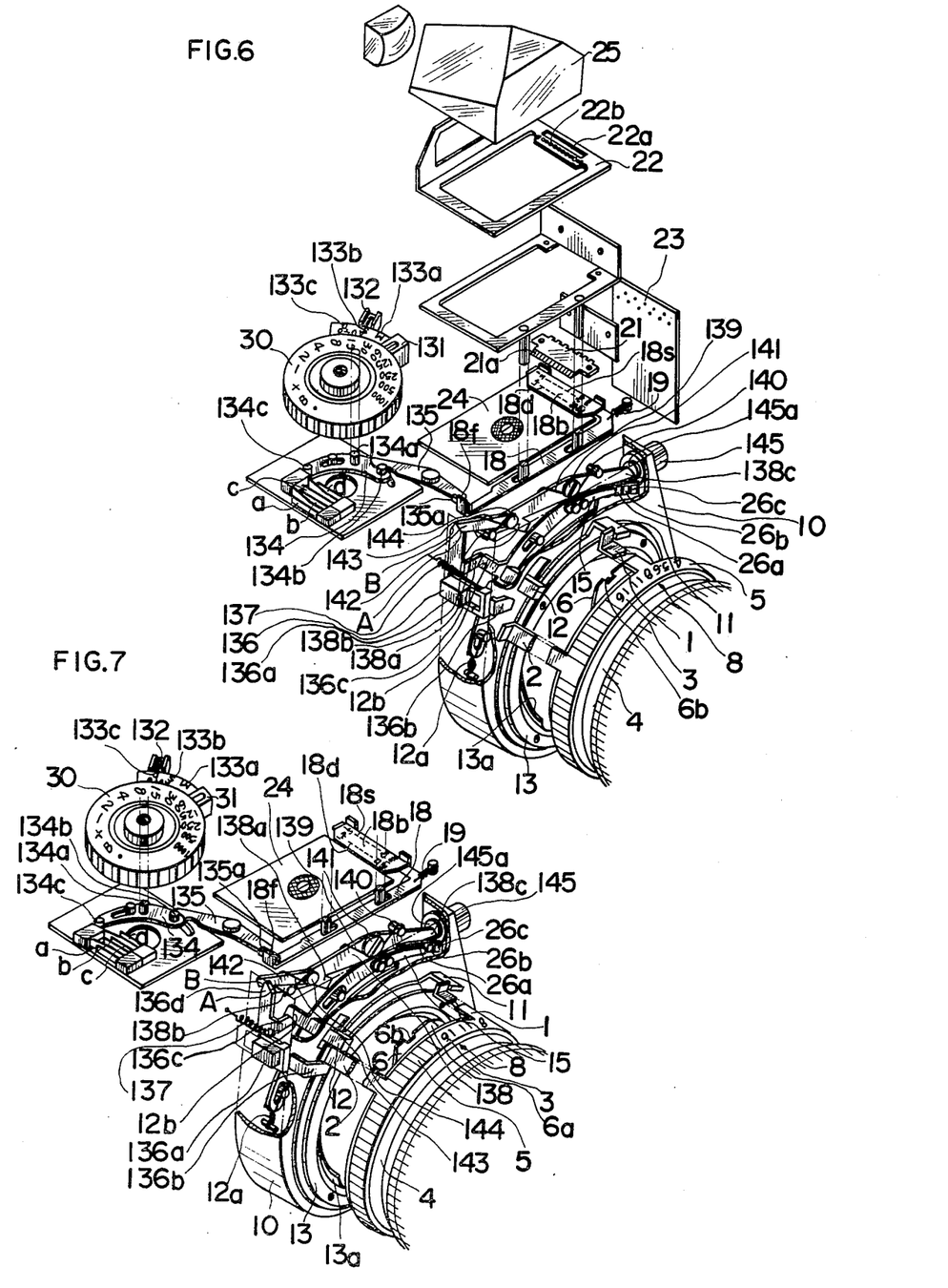
FIG. 6 is an exploded perspective view showing a single lens reflex camera according to a second embodiment of the present invention in the condition of the diaphragm priority shutter speed automatic control mode.
FIG. 7 is a fragmentary perspective view of the camera of FIG. 6 in the condition of the shutter speed priority diaphragm automatic control mode.

With the embodiment of the aforesaid arrangement, when selecting member 132 is set to index 133b for the diaphragm priority shutter speed automatic control mode, a changeover plate 18 is moved to the left as shown in FIG. 6, against the action of spring 19 by means of the aforesaid cooperative systems 132, 134, 135. As a result, shutter speed graduations 18s are positioned between light guide 21 and slot 22a in limiting mask 22, whereby shutter speed graduations 18s become visible in the viewfinder. At the same time, switch 36 is connected to contact a, and switch 37 is connected to contact c, thereby bringing the circuit into the diaphragm priority shutter speed automatic control mode, and an optimum shutter speed to be controlled may be indicated by one of light emitting diodes 23 which is being lit. In this case, diaphragm presetting member 5 for an exhangeable lens is set to a desired f-number beforehand.

As shown in FIG. 7, for the shutter speed priority diaphragm automatic control mode, selecting member 132 is set to select index 133c, and maximum f-number graduation 3 on diaphragm presetting member 5 for exchangeable lens 4 is set to index 8 to establish the second transmission system.

Then, change-over plate 18 is moved to the right under the action of spring 19, so that diaphragm graduations 18d on graduation plate 18b are interposed between light guide 21 and slot 22a, thereby making the same observable in the viewfinder. Simultaneously therewith, switch 36 is changed over to the contact d, and the circuit is brought into the shutter speed priority diaphragm automatic control mode, and an optimum f-number to be automatically controlled is indicated by one of light emitting diodes 23, which is being lit.

The following is a description of the relationship between a locking device for the second transmission system, and a lens locking device for locking an exchangeable lens on a camera body. As shown in FIGS. 6 and 7, a locking member 136 may be slidingly moved along the optical axis by manually moving its operating portion 136a in the direction at a right angle to the seat plate 13, against the action of spring 137. The front end of locking member 136 is formed with a bent locking portion 136d adapted to lock member 12, from its counterclockwise rotation under the action of spring 12a. The rear end of locking member 136 is provided with a bent portion 136c engageable with projection 12b on member 12, and a projecting portion 136d engageable with a locking lever 142, which is supported on a lens lock lever 138 to be described later in a spring-loaded manner. The top end of projecting portion 136d is formed with tapered surfaces A and B in a triangular shape.

The locking mechanism for an exchangeable lens is well known. As shown in FIGS. 6 to 9, a lens lock lever 138, rotatably supported on a shaft 141 secured to camera body 10, is loaded so as to rotate counterclockwise under the action of spring 139, and held in position by a stopper 140.

Exchangeable lens 4 is mounted on camera body 10 in a known manner. As shown in FIGS. 6 and 7, a bayonet pawl 13a is formed on seat plate 13, while a bayonet pawl 6 is formed on exchangeable lens 4. Bayonet pawl 6 is brought into abutment with pawl 13a in a given position, and then the pawls 6, 13a are brought into meshing relation by rotating exchangeable lens 4 clockwise.

Figure 8:
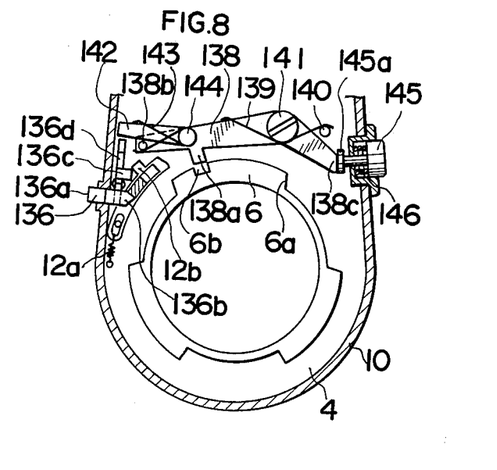
FIG. 8 is a cross-sectional elevational view of an essential structure of the camera of FIG. 6, in which a locking member is about to engage a cut away portion of a bayonet pawl of an exchangeable lens.
Figure 9:
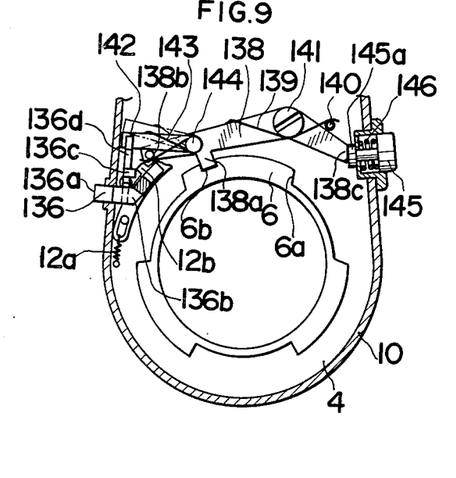
FIG. 9 is a cross-sectional elevational view of the same structure as FIG. 8, in which the locking member is in engagement with the cut away portion.

Pawl 6 is formed with a cam portion 6a having a cut-away portion 6b. Upon mounting of lens 4 on camera body 10, cam portion 6a engages projection 138a formed on lock lever 138, thereby rotating lock lever 138 clockwise as shown in FIG. 8 against the action of spring 139. When exchangeable lens 4 is rotated clockwise, projection 138a is fitted in cut-away portion 6b as shown in FIG. 9, and lock lever 138 is rotated counterclockwise under the action of spring 139 for engagement with pawl 6, so that exchangeable lens 4 may be locked on camera body 10.

A releasing member 145 is provided on camera body 10. Releasing member 145 is loaded under the action of spring 146 in a manner that an abutting surface 145a thereof may abut an inclined surface 138c of one end of lock lever 138. One end of releasing member 145 projects from camera body so as to be externally actuated. When releasing member 145 is pressed against the action of spring 146, then abutting surface 145a presses inclined surface 138c for rotating lock lever 138 clockwise against the action of spring 139, so that projection 138a is released from cut-away portion 6b. Accordingly exchangeable lens 4 is permitted to be rotated counterclockwise, so that bayonet pawl 13a may be disengaged from pawl 6, and the exchangeable lens may be removed from the camera body.

Arresting lever 142, supported on a shaft 144 secured to lock lever 138, is spring-loaded so as to rotate coaunterclockwise and held in position by means of a stopper 138b, and a tip of lever 142 is adapted to engage projecting portion 136d on locking member 136.

Accordingly, as shown in FIG. 6, when a graduation other than maximum f-number graduation 3 on diaphragm presetting member 5 for exchangeable lens 4 is set to index 8, projection 136c on locking member 136 engages the rear end of projection 12b on member 12 which is moved to its left-hand extremity, so that locking member 136 can not be moved forward along the optical axis for locking diaphragm presetting member 5. In this case, even if lock lever 138 is swung back and forth, arresting lever 142 remains continuously on the front-side tapered surface A of projecting portion 136d of locking member 136.

In contrast thereto, as shown in FIG. 7, when maximum f-number graduation 3 on diaphragm aperture setting member 5 for exchangeable lens 4 is set to index 8, so that member 12 is rotated clockwise, then projection 136c is disengaged from the rear end of projection 12b. When locking member 136 is moved forward to a locking position along the optical axis, then arresting lever 142 is rotated clockwise upwards against the action of spring 143 so as to slide on tapered surface A, and rides over the top of projecting portion 136d into engagement with tapered surface B, thereby preventing locking member 136 from returning under the action of spring 137. At this time, locking portion 136b engages member 2 to lock the same, so that member 12 may be prevented from moving to the left-hand extremity of its movement under the action of spring 12a. Accordingly, diaphragm presetting member 5 is held at the maximum f-number position wherein indication of a f-number representative of an automatically controlled aperture is allowed. Thus, once the locking operation is carried out by means of locking member 136, the camera allows repeated photography in the shutter speed priority diaphragm automatic control mode of the highest frequency in use.

In the meanwhile, if an exchangeable lens is to be exchanged under the above locked condition, and the exchangeable lens is removed from the camera body, there may be a possibility that an undesirable force is created in locking portion 136b, second transmitting member 2, second receiving member 12, arresting lever 142, lock lever 138 and the like, or that some deformation takes place therein.

However, according to the embodiment of the invention, when releasing member 145 is depressed so as to remove exchangeable lens 4 from camera body 10, lock lever 138 is rotated clockwise so as to disengage projection 138a from cut-away portion 6b; arresting lever 142 is rotated clockwise therewith; and arresting lever 142 is disengaged from tapered surface B; locking member is drawn towards camera body 10 along the optical axis under the action of spring 137 to release the locking condition. As a result, a forcibly pressed condition between members 2 and 12 by means of locking portion 136b may be released, so that upon removal of exchangeable lens 4 from camera body 10, there may be eliminated a forcibly pressed condition between second transmitting member 2 and second receiving member 12. Accordingly, the exchangeable lens may be smoothly removed from camera body 10 without a danger of damage and deformation. In other words, upon removal of an exchangeable lens from a camera body, the releasing operation of the locking for the second information transmission system and the releasing operation of the locking for an exchangeable lens should not be carried out individually, but these releasing operations may be carried out by a single operation of pressing the releasing member 145. In addition, upon mounting of an exchangeable lens, a conventional procedure for mounting the lens may be similarly followed, and a photographic mode may be brought to a mode of the highest frequency in use, as required, by means of locking member 136. Thus, the camera according to the present invention may provide various advantages which could not have been achieved by the prior art cameras.

Figure 10:
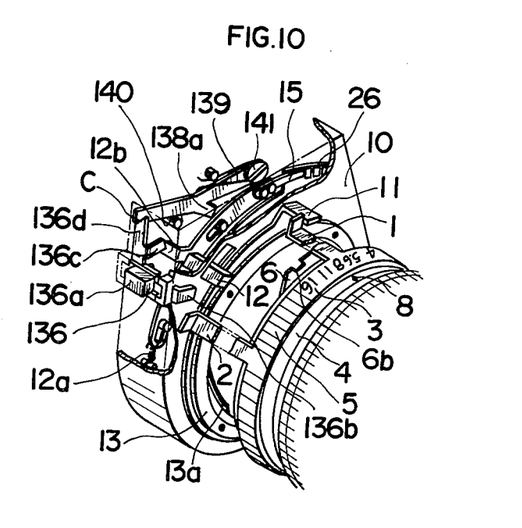
FIG. 10 is a fragmentary perspective view of a single lens reflex camera according to a third embodiment of the present invention.

FIG. 10 shows a third embodiment in which an exchangeable lens may be released from its locked condition by means of locking member 136.

When lock lever 138, supported on shaft 141 and loaded to rotate counterclockwise under the action of spring 139, is held in position by means of stopper 140, projection 138a on lock lever 138 enters cut-away portion 6b for an exchangeable lens mounted on camera body 10 due to the engagement of bayonet pawls 13a, 6, thereby locking exchangeable lens 4 to camera body 10, as in the case of the second embodiment. However, lock lever 138 engages projecting portion 136d on locking member 136 and then engages tapered surface C due to the forward movement of locking member 136 along the optical axis, followed by clockwise rotation against the action of spring 139, thereby disengaging projection 138a from cut-away portion 6b.

Accordingly, when maximum f-number graduation 3 on diaphragm presetting member 5 is set to index 8 and locking member 136 is moved forwards along the optical axis by means of operating portion 136a, then locking portion 136b engages member 12 to lock the same, whereby diaphragm presetting member 5 as well is locked at the maximum f-number position. At the same time, tapered surface C of projecting portion or operating member 136d allows lock lever 138 to rotate counterclockwise by means of spring 139 for bringing projection 138a into engagement with cut-away portion 6b, and then exchangeable lens 4 may be mounted on camera body 10 in a locked condition.

In contrast thereto, when operating portion 136a on locking member 136 is manually moved rearwards along the optical axis, member 2 is released from a locked condition by locking portion 136b, so that a desired f-number graduation on diaphragm presetting member 5 is set to index 8, thereby allowing photography in the diaphragm priority shutter speed automatic control mode or the manual exposure control mode. At the same time, tapered surface C on projecting portion 136d causes lock lever 138 to rotate clockwise against the action of spring 139, thereby disengaging projection 138a from cut-away portion 6b, thus allowing exchangeable lens 4 to rotate counterclockwise relative to camera body 10, so that the exchangeable lens may be removed from the camera body.

Accordingly, in the exposure control modes other than the shutter speed priority diaphragm automatic control mode, exchangeable lens 4 remains released from its condition to be locked on camera body 10. However, exchangeable lens 4 may maintain its condition mounted on camera body 10 due to frictional engagement of bayonet pawl 13a with pawl 6. Thus, every time when lens 4 is released from its locked condition, locking member 136 as well is necessarily released from its locking condition.

We claim:

1. A lens exchangeable camera of the through-the-lens light measurement type, which is selectively settable to a shutter speed priority diaphragm automatic control mode, and to at least one of either a manual exposure control mode or a diaphragm priority shutter speed automatic control mode, said camera comprising:
   a camera body;
   an exchangeable lens detachably mounted on said camera body and including an objective lens, an adjustable diaphragm and a diaphragm presetting member settable to a desired f-number between maximum and minimum f-numbers of said exchangeable lens;
   means for generating a first signal commensurate with the minimum f-number of said exchangeable lens when said diaphragm presetting member is set to a specific position wherein the maximum f-number of said exchangeable lens is preset;
   a light measuring circuit for generating a second signal commensurate with the intensity of light having passed through said objective lens and an aperture formed by said diaphragm;
   means for generating a third signal commensurate with a preselected shutter speed;
   means for generating a fourth signal commensurate with a set film sensitivity;
   means for indicating a f-number representative of an automatically controlled diaphragm aperture in accordance with said first to fourth signals; and
   first locking means arranged on said camera body for locking said diaphragm presetting member at said specific position.

2. A lens exchangeable camera as defined in claim 1, wherein said first locking means includes a manually operable member such that said first locking means is movable between an operative and an inoperative positions capable of and incapable of locking said diaphragm presetting member at said specific position, respectively, by manipulation of said manually operable member.

3. A lens exchangeable camera as defined in claim 2, further comprising an exposure mode change-over device interlocked with said first locking means such that said exposure change-over mode device sets the camera to the shutter speed priority diaphragm automatic control mode when said first locking means is moved to its operative position.

4. A lens exchangeable camera as defined in claim 2, further comprising second locking means for locking said exchangeable lens mounted on said camera body, said second locking means being arranged on said camera body to be movable between operative and inoperative positions respectively capable of and incapable of locking said exchangeable lens, and having an arresting member engageable with said first locking means in said operative position to prevent the movement of said first locking means to its inoperative position when said second locking means is in said operative position, said arresting member being disengageable from said first locking means to allow the movement of said first locking means to said inoperative position when said second locking means is in said inoperative position.

5. A lens exchangeable camera as defined in claim 4, further comprising means for urging said first locking means from said operative position to said inoperative position.

6. A lens exchangeable camera as defined in claim 5, further comprising means for urging said second locking means from said inoperative position to said operative position and manually operable means arranged on said camera body to be manipulated for moving said second locking means to said inoperative position against the action of said urging means.

7. A lens exchangeable camera as defined in claim 2, further comprising second locking means for locking said exchangeable lens on said camera body, said second locking means being arranged on said camera body to be movable between operative and inoperative positions respectively capable of and incapable of locking said exchangeable lens, said first locking means having an operating member interlocked with said second locking means to hold said second locking means at said inoperative position when said first locking means is in said inoperative position, and said operating member allowing said second locking means to be moved from said inoperative position to said operative position when said first locking means is in said operative position.

8. A lens exchangeable camera as defined in claim 7, further comprising means for urging said second locking means from said inoperative position to said operative position.

9. A lens exchangeable camera as defined in claim 1, wherein said means for generating said first signal includes a first information transmitting system for transmitting from said exchangeable lens to said camera body first information of the step-difference from the minimum f-number to a preset f-number of said exchangeable lens when said exchangeable lens is mounted on said camera body, a second information transmitting system for transmitting from said exchangeable lens to said camera body second information of the maximum f-number of said exchangeable lens when said exchangeable lens is mounted on said camera body and said diaphragm presetting member is set to the maximum f-number of said exchangeable lens, and means for combining said first and second information transmitted to said camera body with one another to generate said first signal commensurate with the information of the minimum f-number of said exchangeable lens, with said diaphragm presetting member set to the maximum f-number of said exchangeable lens.

10. A lens exchangeable camera as defined in claim 9, wherein said second information transmitting system includes an information transmitting member provided on said diaphragm presetting member in such manner that its position thereon is dependent on the value of the maximum f-number of said exchangeable lens, and an information receiving member provided on said camera body so as to be engageable with said information transmitting member only when said diaphragm presetting member is set to the maximum f-number of said exchangeable lens, and wherein said first locking means includes a locking member cooperable with said information transmitting member to lock said diaphragm presetting member when said diaphragm presetting member is set to the maximum f-number of said exchangeable lens.

* * * * *